United States Patent
Hoffmann

(10) Patent No.: US 11,380,506 B2
(45) Date of Patent: Jul. 5, 2022

(54) METHOD FOR MONITORING AN ELECTROMECHANICAL COMPONENT OF AN AUTOMATED SYSTEM

(71) Applicant: Phoenix Contact GmbH & Co. KG, Blomberg (DE)

(72) Inventor: Ralf Hoffmann, Berlin (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 508 days.

(21) Appl. No.: 16/467,837

(22) PCT Filed: Dec. 11, 2017

(86) PCT No.: PCT/EP2017/082268
§ 371 (c)(1),
(2) Date: Jun. 7, 2019

(87) PCT Pub. No.: WO2018/108833
PCT Pub. Date: Jun. 21, 2018

(65) Prior Publication Data
US 2021/0358710 A1  Nov. 18, 2021

(30) Foreign Application Priority Data

Dec. 12, 2016 (LU) .......................................... 93350

(51) Int. Cl.
*H01H 71/04* (2006.01)
*G05B 23/02* (2006.01)
*H01H 1/00* (2006.01)

(52) U.S. Cl.
CPC ......... *H01H 71/04* (2013.01); *G05B 23/0254* (2013.01); *H01H 1/0015* (2013.01); *H01H 2071/044* (2013.01)

(58) Field of Classification Search
CPC .. H01H 71/1081; H01H 71/164; H01H 71/24; H01H 71/2418; H01H 71/2463;
(Continued)

(56) References Cited

U.S. PATENT DOCUMENTS 6,225,807 B1   5/2001 Pohl
2013/0024179 A1   1/2013 Mazzaro et al.
(Continued)

FOREIGN PATENT DOCUMENTS

CN        1233325 A   10/1999
CN      102282444 A   12/2011
(Continued)

*Primary Examiner* — Bryan R Perez
(74) *Attorney, Agent, or Firm* — Holland & Hart LLP

(57) ABSTRACT

The present disclosure relates to a method for monitoring an electromechanical component of an automation system. The method includes sensing a current mechanical state variable of the electromechanical component, sensing a current electrical state variable of the electromechanical component and determining a state of the electromechanical component based at least in part on a behaviour model of the electromechanical component, wherein the behaviour model takes into account an effect of the sensed current mechanical state variable on the sensed current electrical state variable.

19 Claims, 17 Drawing Sheets

(58) Field of Classification Search
CPC .... H01H 71/2472; H01H 71/40; H01H 71/50;
H01H 71/525; H01H 71/56; H01H
71/7463; H01H 33/022; H01H 33/08;
H01H 33/14; H01H 33/16; H01H 33/59;
H01H 33/6662; H01H 33/7015; H01H
73/02; H01H 73/18; H01H 73/20; H01H
77/10; H01H 77/108; H01H 9/02; H01H
9/161; H01H 9/167; H01H 9/346; H01H
9/44; H01H 9/46
See application file for complete search history.

(56) References Cited

U.S. PATENT DOCUMENTS

| | | | |
|---|---|---|---|
| 2013/0278269 | A1 | 10/2013 | Steck et al. |
| 2014/0327995 | A1* | 11/2014 | Panjwani ................ H02H 7/10 |
| | | | 361/93.1 |
| 2015/0276877 | A1* | 10/2015 | Biswas .............. G01R 31/3275 |
| | | | 702/58 |

FOREIGN PATENT DOCUMENTS

| | | |
|---|---|---|
| CN | 202837496 U | 3/2013 |
| CN | 103323770 A | 9/2013 |
| CN | 103954910 A | 7/2014 |
| CN | 105548874 A | 5/2016 |
| CN | 105652198 A | 6/2016 |
| CN | 105723491 A | 6/2016 |
| DE | 196 01 359 A1 | 7/1997 |
| DE | 102010041998 A1 | 4/2021 |
| EP | 2804064 A1 | 11/2014 |
| JP | 2006253010 A | 9/2006 |
| JP | 2014120371 A | 6/2014 |

* cited by examiner

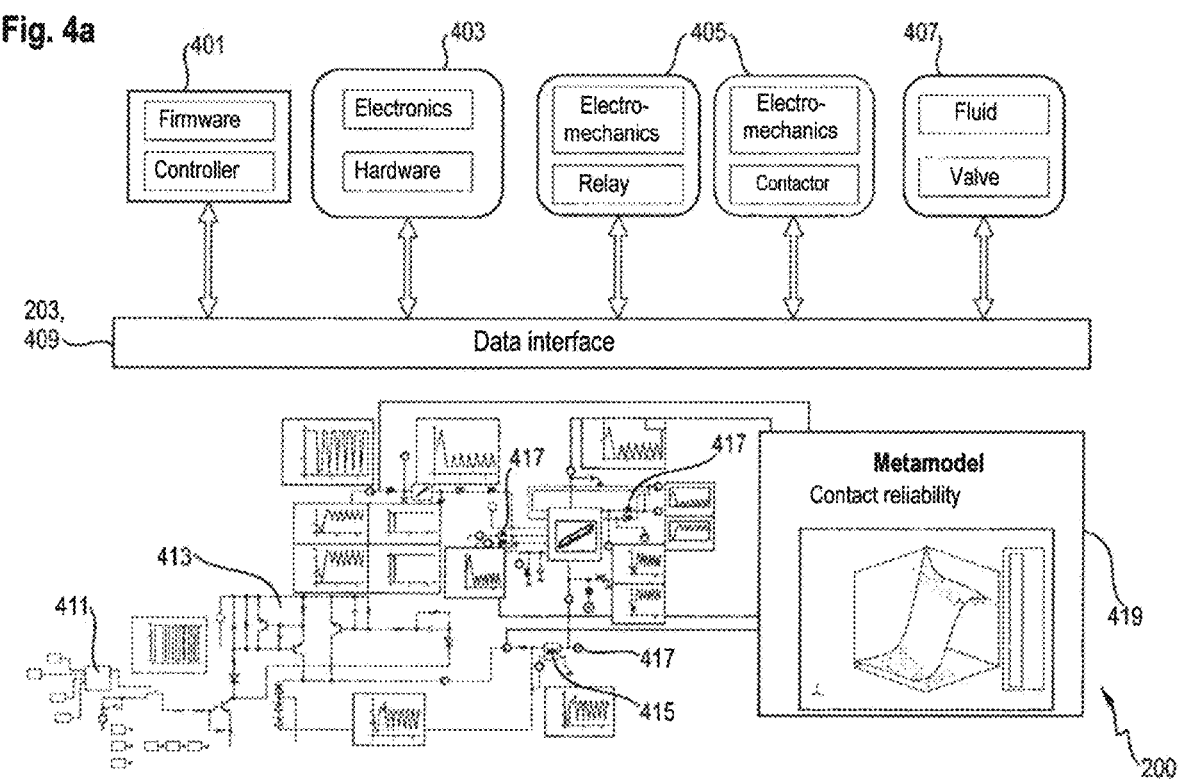

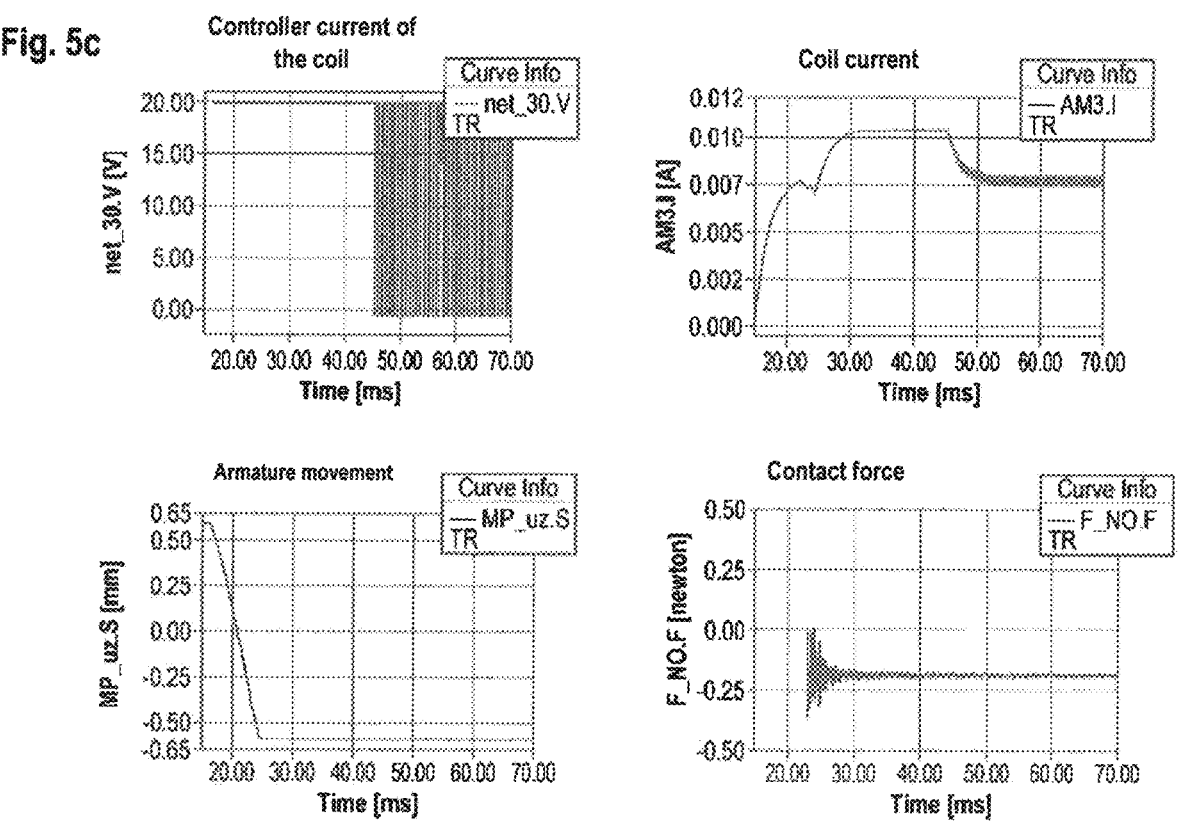

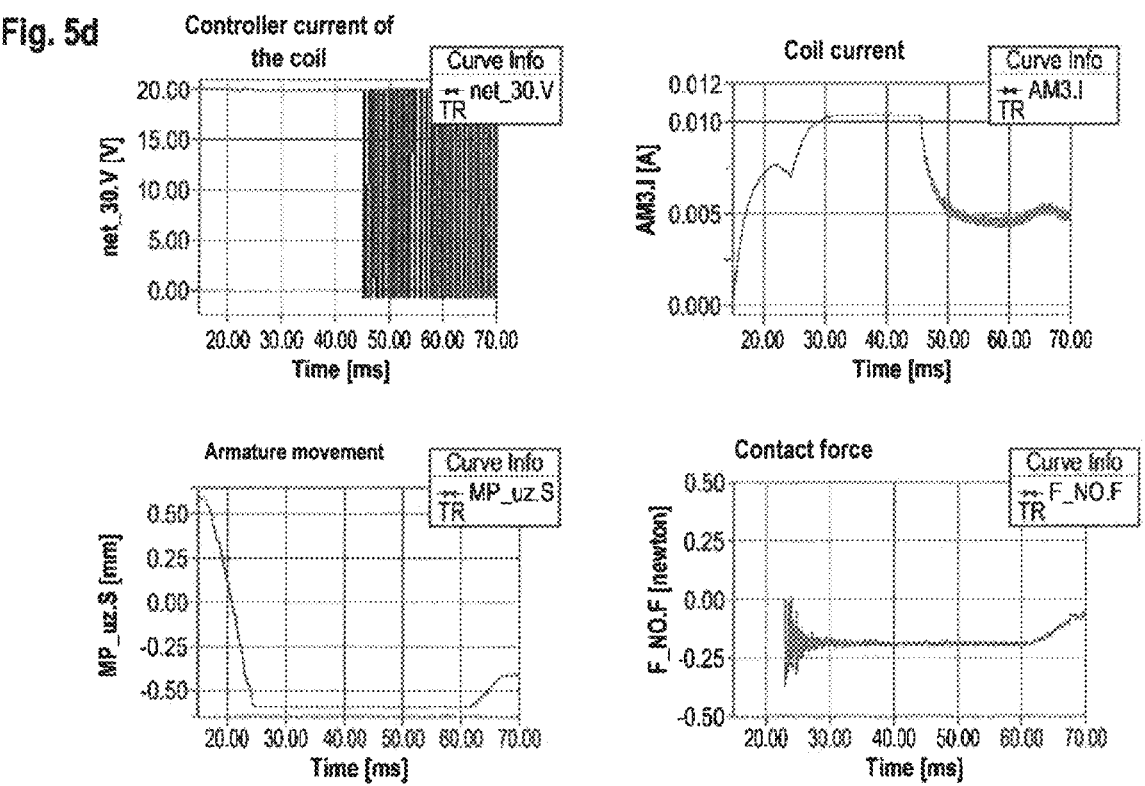

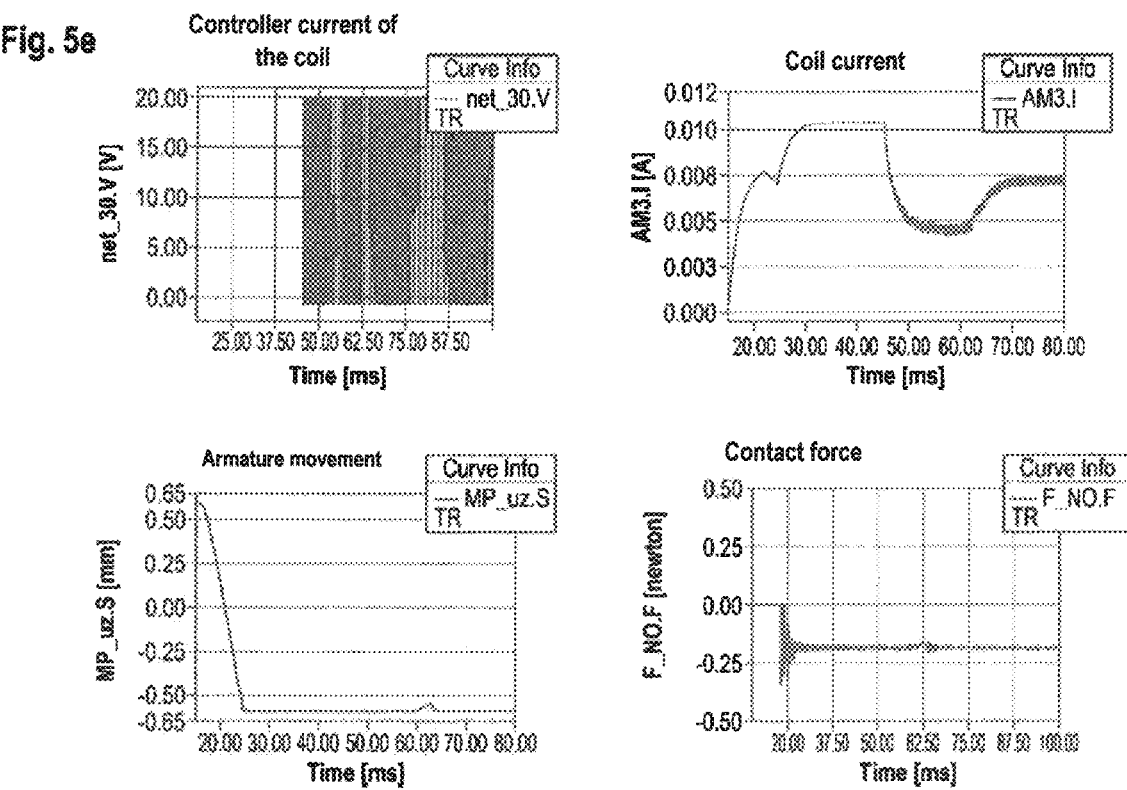

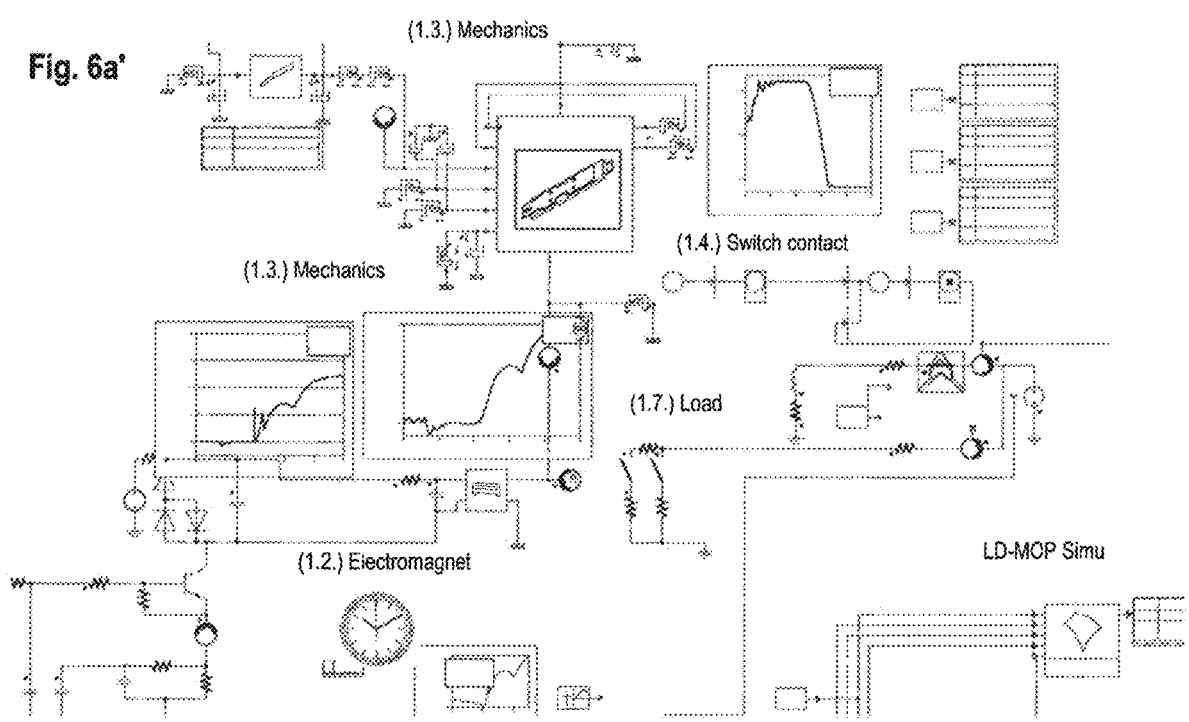

METHOD FOR MONITORING AN ELECTROMECHANICAL COMPONENT OF AN AUTOMATED SYSTEM

CROSS-REFERENCE TO RELATED APPLICATIONS

This application is a 371 national phase filing of International Application No. PCT/EP2017/082268, entitled "METHOD FOR MONITORING AN ELECTROMECHANICAL COMPONENT OF AN AUTOMATION SYSTEM", filed 11 Dec. 2017, which claims priority to Luxembourg Patent Application No. 93350, entitled "Verfahren zur Überwachung einer elektromechanischen Komponente eines Automatisierungssystems", filed 12 Dec. 2016.

BACKGROUND

The present disclosure relates to the field of automation technology.

In an electromechanical component in an automation system, for example in a switchgear or a safety relay, the state and the mode of operation of the electromechanical component can change as a function of the ambient conditions. This is caused by temperature changes, shock vibrations, component wear, contact wear of electrical switch contacts or mechanical wear of valves, for example.

At the present time, it is typical for individual characteristic values in the automation system to be sensed and compensated or compared with predefined characteristic values, for example with the aid of a control system. In the event of deviations, a correction can be carried out or, in the event of a potential hazard, a shutdown can be executed. Previously known relationships between characteristic values, or changes in characteristic values and system states, are typically stored as error descriptions in memories and used for evaluation.

SUMMARY

The behaviour of complex automation systems having multiple domains (so-called multi-domain systems) is typically characterised in that changes of individual characteristic values occur as a function of states, i.e. changes in other characteristic values, as a result of which mutual interactions and reactions occur. These interactions and reactions can often not be described using unidirectional description matrices, for example using look-up tables (LUTs), and can therefore not be adequately depicted in previously known error descriptions.

One example of a reaction is the effect of the movement of an armature of an electromechanical relay on the torque, i.e. the force, in which a corresponding voltage is induced in the event of changes in the speed of a movement, which results in an effect on a coil current and thus to an effect on a torque, i.e. a force. A counterforce of the armature is, among other things, a function of the spring force of the contact spring, and thus also of the wear of the contacts over the service life or of the temperature of the coil, and consequently of the excitation of the neighbouring relay, for example. Other changing characteristic values can include the change in the service life of a contact as a result of changing bounce behaviour of contacts, for example, as well as a further change as a function of ambient conditions or control conditions.

The object of the present disclosure is therefore to create an efficient concept for monitoring an electromechanical component of an automation system.

This object is achieved with the features of the independent claims. Advantageous further developments are the subject matter of the dependent claims, the description and the drawings.

According to a first aspect, the present disclosure relates to a method for monitoring an electromechanical component of an automation system. The method comprises sensing a current mechanical state variable of the electromechanical component; sensing a current electrical state variable of the electromechanical component, and determining a state of the electromechanical component on the basis of a behaviour model of the electromechanical component, wherein the behaviour model takes into account an effect of the sensed current mechanical state variable on the sensed current electrical state variable.

According to one example, the electromechanical component is an electromagnetic switch, such as a relay.

According to one example, the current mechanical state variable includes one of the following mechanical state variables: a bounce of a contact of the electromechanical component, a bounce duration of a bounce of a contact of the electromechanical component, a bounce number of bounces of a contact of the electromechanical component, a temperature of an element of the electromechanical component, an ambient temperature of the electromechanical component, a movement speed of an element of the electromechanical component, such as an armature, a contact force or a release force of a contact of the electromechanical component.

According to one example, for sensing the current mechanical state variable, an electrical variable of the electromechanical component, such as a load current or a change in a load current, is sensed.

According to one example, the electrical variable is a current through the electromagnetic component or a voltage of the electromechanical component.

According to one example, the behaviour model is assigned to the electromechanical component, wherein the behaviour model provides a profile of the electrical state variable as a function of the mechanical state variable.

According to one example, the state of the electromechanical component is determined by running a behaviour simulation of the electromechanical component, wherein the behaviour simulation implements the behaviour model.

According to one example, the method further comprises displaying the determined state of the electromechanical component, such as by means of a display device.

According to one example, the method further comprises generating a control signal for controlling the electromechanical component in response to the determined state of the electromechanical component, and controlling the electromechanical component using the generated control signal.

According to one example, the current mechanical state variable and the current electrical state variable are sensed by the electromechanical component.

According to one example, the sensed current mechanical state variable and the sensed current electrical state variable are transmitted from the electromechanical component to a remote data processing device via a communication network, wherein the state of the electromechanical component is sensed by the remote data processing device and transmitted to the electromechanical component.

According to a second aspect, the present disclosure relates to an electromechanical component. The electromechanical component comprises a sensing device, which is configured to sense a current mechanical state variable of the electromechanical component and a current electrical state variable of the electromechanical component. The electromechanical component further comprises a communication interface, which is configured to transmit the sensed current mechanical state variable and the sensed current electrical state variable to a remote data processing device via a communication network for determining a state of the electromechanical component on the basis of a behaviour model of the electromechanical component, wherein the behaviour model takes into account an effect of the sensed current mechanical state variable on the sensed current electrical state variable. The communication interface is configured to receive information about the determined state via the communication network.

The electromechanical component is configured to carry out the method. Further features of the electromechanical component result directly from the features of the method.

According to one example, the electromechanical component further comprises a display device which is configured to display the sensed state.

According to one example, the electromechanical component further comprises a control device, which is configured to generate a control signal for controlling the electromechanical component in response to the sensed state and control the electromechanical component using the generated control signal.

According to a third aspect, the present disclosure relates to a computer program having a program code for executing the method. The electromechanical component and the remote data processing device can be programmatically configured to execute the program code or parts of the program code.

The principles of the present disclosure can be implemented in hardware and/or in software.

BRIEF DESCRIPTION OF DRAWINGS

Further examples will be explained in more detail with reference to the accompanying figures.

FIG. 5c shows a schematic diagram of time profiles of state variables of an electromechanical component;

FIG. 5d shows a schematic diagram of time profiles of state variables of an electromechanical component;

FIG. 5e shows a schematic diagram of time profiles of state variables of an electromechanical component;

DETAILED DESCRIPTION

Figure 1:
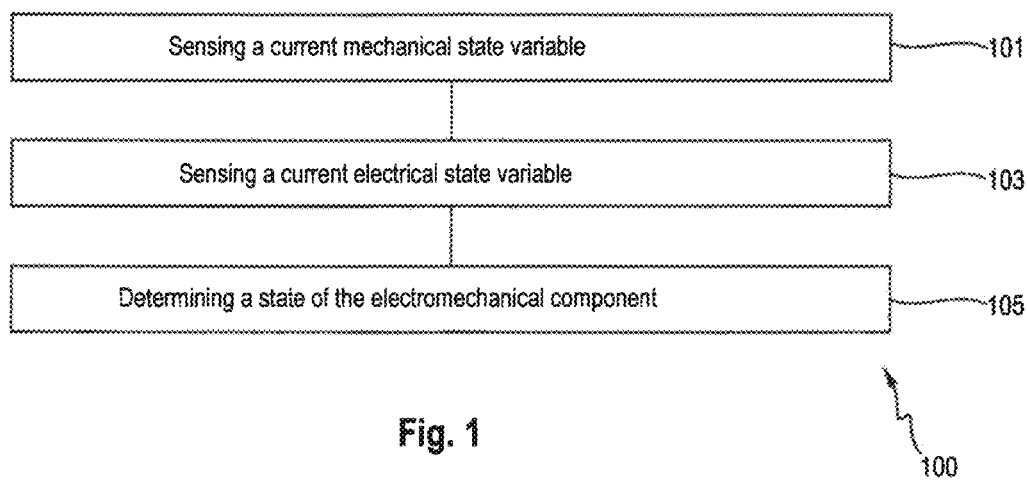
FIG. 1 shows a schematic diagram of a method for monitoring an electromechanical component of an automation system.

FIG. 1 shows a schematic diagram of a method 100 for monitoring an electromechanical component of an automation system. The method 100 comprises sensing 101 a current mechanical state variable of the electromechanical component; sensing 103 a current electrical state variable of the electromechanical component, and determining 105 a state of the electromechanical component on the basis of a behaviour model of the electromechanical component, wherein the behaviour model takes into account an effect of the sensed current mechanical state variable on the sensed current electrical state variable.

Figure 2:
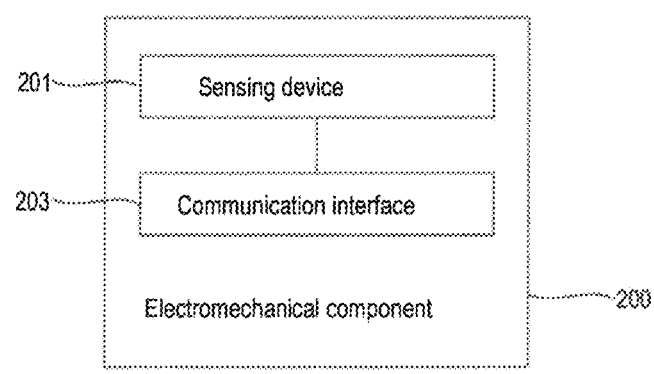
FIG. 2 shows a schematic diagram of an electromechanical component.

FIG. 2 shows a schematic diagram of an electromechanical component 200. The electromechanical component 200 comprises a sensing device 201, which is configured to sense a current mechanical state variable of the electromechanical component 200 and a current electrical state variable of the electromechanical component 200. The electromechanical component 200 further comprises a communication interface 203, which is configured to transmit the sensed current mechanical state variable and the sensed current electrical state variable to a remote data processing device via a communication network for determining a state of the electromechanical component 200 on the basis of a behaviour model of the electromechanical component 200, wherein the behaviour model takes into account an effect of the sensed current mechanical state variable on the sensed current electrical state variable. The communication interface 203 is configured to receive information about the determined state via the communication network.

Figure 3:
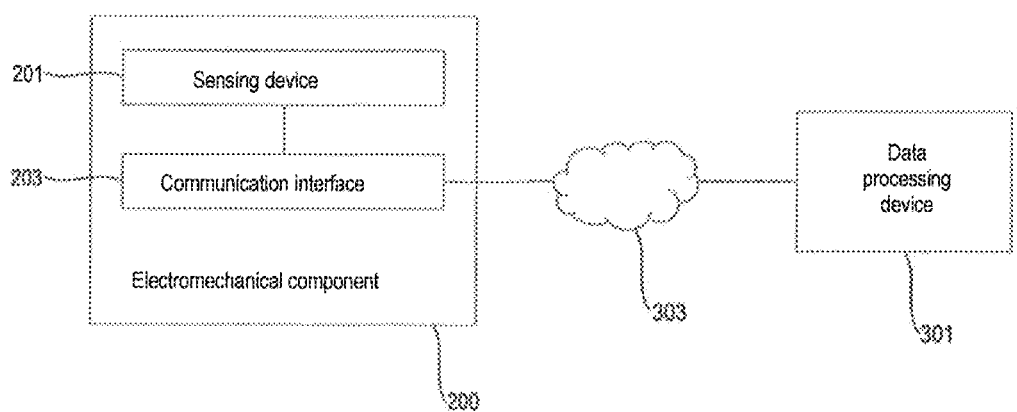
FIG. 3 shows a schematic diagram of an electromechanical component and a data processing device.

FIG. 3 shows a schematic diagram of an electromechanical component 200 and a data processing device 301. The electromechanical component 200 and the data processing device 301 communicate via a communication network 303. The electromechanical component 200 comprises a sensing device 201, which is configured to sense a current mechanical state variable of the electromechanical component 200 and a current electrical state variable of the electromechanical component 200. The electromechanical component 200 further comprises a communication interface 203, which is configured to transmit the sensed current mechanical state variable and the sensed current electrical state variable to the remote data processing device 301 via the communication network 303 for determining a state of the electromechanical component 200 on the basis of a behaviour model of the electromechanical component 200, wherein the behaviour model takes into account an effect of the sensed current mechanical state variable on the sensed current electrical state variable. The communication interface 203 is configured to receive information about the determined state via the communication network 303.

Further examples of the method 100 and of the electromechanical component 200 will be described in more detail in the following.

The method 100 permits analysis and monitoring of the electromechanical component 200 using a behaviour model, for which a behaviour simulator can be used. The electromechanical component 200 can be a switchgear, for example. Using the state variables transmitted from the real electromechanical component 200, which can be characteristic values, the concept makes it possible to depict a behaviour of the electromechanical component 200 with the aid of a behaviour simulation.

In the behaviour simulation or system simulation, components of different domains present in an automation system are depicted in behaviour models and linked via state variables or effect variables, for example via a current, a force, a flux or a logic state. The advantage of the behaviour simulation is, for example, that the effect and the reaction of the state variables can be taken into account. Reactive effects of mechanical systems on electromagnetic and electrical systems, for instance, can thus be depicted.

The behaviour simulation thus depicts a real state of the electromechanical component 200 present at the point in time at which the state variables are sensed. Changes in the mechanical or electrical state variables, for example, are thus sensed. Any relevant changes or decisions can be transferred to the real electromechanical component 200, for example.

In addition to the depiction in behaviour models with a bidirectional flow of the state variables, complex behaviour models can be depicted using metamodels and incorporated into the behaviour simulation. The use of metamodels is advantageous, for example, for the visualisation of a reliability behaviour of electrical contacts as a function of a load, a mechanical overstroke, a contact gap, a contact force, a restoring force, a time-dependent bounce or an opening speed. Furthermore, by incorporating metamodels, the probability of a failure at a current point in time can be determined using the measured state variables and, in the event of a potentially hazardous state, a shutdown of the automation system can be executed.

The method can be implemented in a variety of ways.

Option 1:

The electromechanical component 200 determines the state variables, for example by means of current measurement, voltage measurement, time measurement or state determination, and transmits said variables to the remote data processing device 301, on which the behaviour model ascertains the behaviour using the sensed data, via the communication network 303, for example via Ethernet, PROFINET or USB. The results of the behaviour simulation are transmitted as a state for controlling the electromechanical component 200; if applicable also for shutting down in order to prevent critical or potentially hazardous states.

Option 2:

The electromechanical component 200 determines the state variables according to Option 1 and transmits said variables to a parallel system in the electromechanical component 200 or the immediate vicinity thereof, for example directly adjacent on a top-hat rail, on which the behaviour model is located and which evaluates the data according to Option 1 and transmits the results to the electromechanical component 200 according to Option 1.

Option 3:

The electromechanical component 200 transmits the data according to Option 1 or 2 to a system, on which the behaviour model is running as an executable object and which transmits the results to the electromechanical component 200 according to Option 1 or 2.

The behaviour, or simulation, model typically comprises objects from the following domains:

Electrical, e.g. electronic circuits, sensors such as light barriers, or switches;
Magnetic, e.g. Reed contacts, sensors;
Electromagnetic, e.g. relays, contactors, valves, Hall sensors;
Fluids, e.g. pressure valves, nozzles;
Thermal sources, e.g. load resistors, heaters, fans, coolers;
Software objects, e.g. firmware blocks, PWM, OSSD; and
Metamodels for depicting stochastic relationships.

Figure 4A:
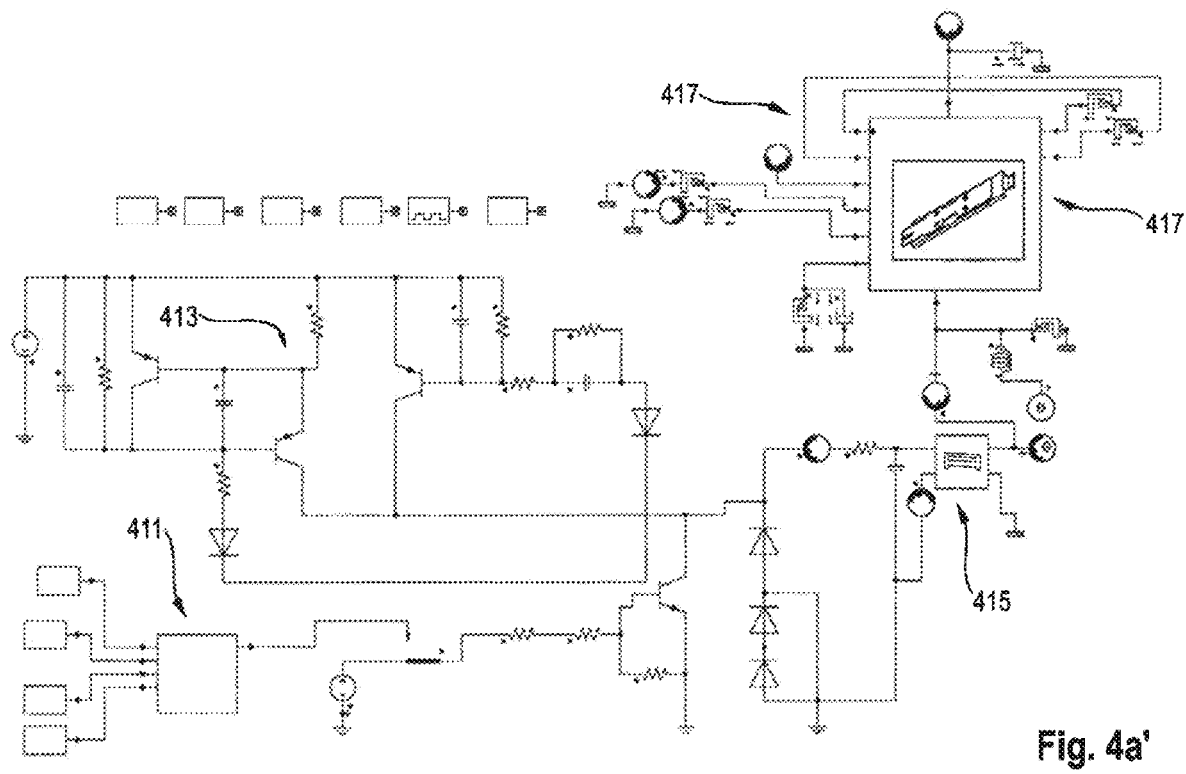
FIG. 4a shows a schematic diagram of an electromechanical component.

FIG. 4*a* and FIG. 4*a*' show a schematic diagram of an electromechanical component 200 which is configured as an electromagnetic switchgear. The electromechanical component 200 comprises a firmware component 401, an electronics component 403, an electromechanical component 405, a fluid component 407, and a communication interface 203 or data interface 409 for bidirectional data transmission. The behaviour model comprises a firmware module 411, an electronics module 413, an electromagnetic module 415, a mechanics module 417, and a metamodel module 419 for determining a contact reliability.

Figure 4B:
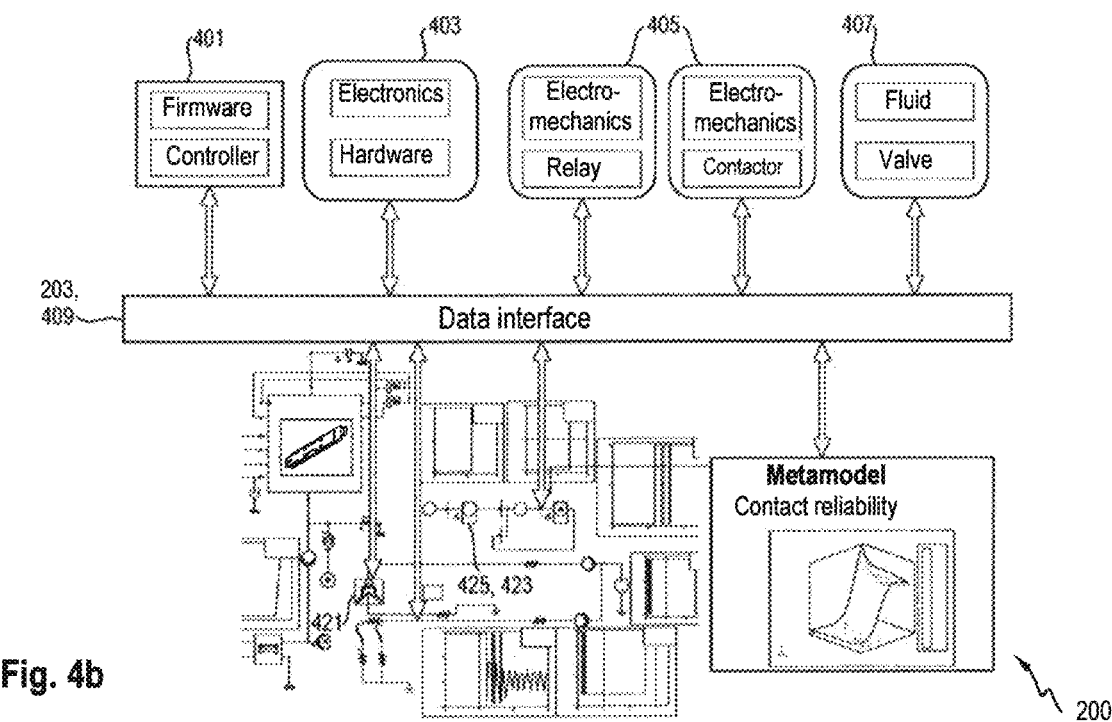
FIG. 4b shows a schematic diagram of an electromechanical component.
Figure 4B:
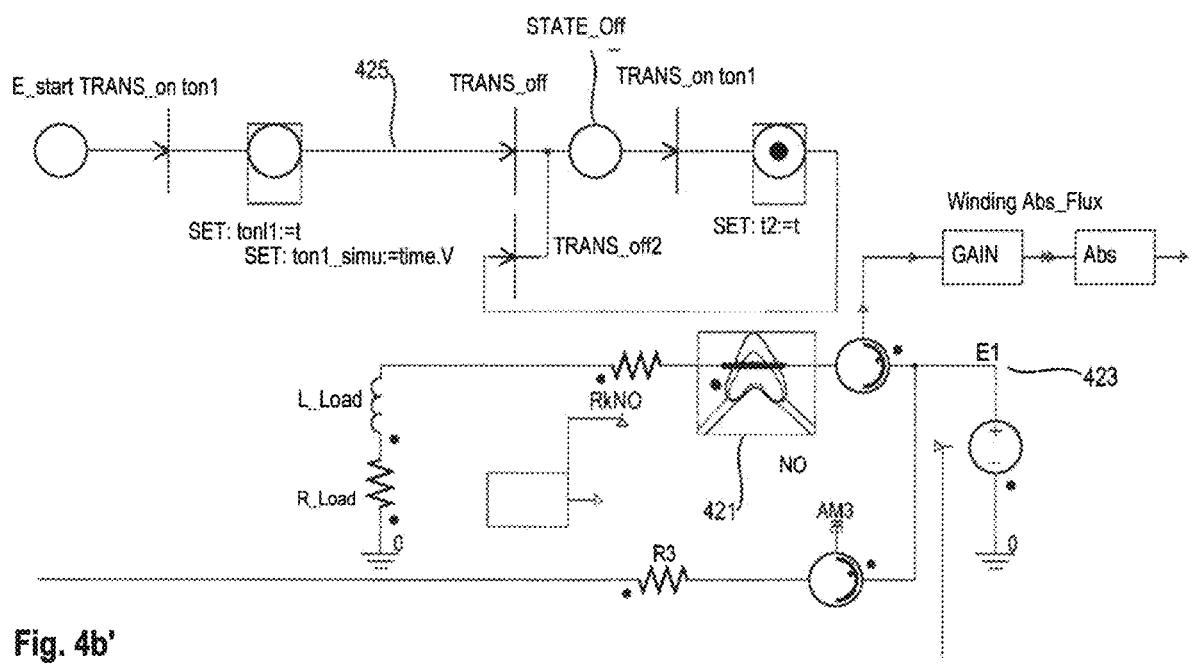

FIG. 4*h* and FIG. 4*b*' show a schematic diagram of an electromechanical component 200 which is configured as an electromagnetic switchgear. The electromechanical component 200 comprises a firmware component 401, an electronics component 403, an electromechanical component 405, a fluid component 407, and a communication interface 203 or data interface 409 for bidirectional data transmission. The behaviour model optionally or additionally comprises an object 421 for determining an arc time, an object 423 for determining a bounce behaviour of contacts, and an object 425 for determining a contact resistance.

FIG. 5*a* to FIG. 5*f* show schematic diagrams of time profiles of
state variables of electromechanical components. Two design examples will be described in more detail in the following.

First Design Example:

In the case of loads having a high inrush current, for example in the case of contactors or motors, the service life of a contact of a relay as an electromechanical component is strongly dependent on the bounce behaviour when the contact is switched on.

If the contact does not bounce, or the bounce time is less than 0.1 µs, so that a switch-on arc can generally not form, the contact wear resulting from heating by the switch-on arc is less than in the case of bouncing contacts with a typical bounce time of more than 1 to 5 ins and a number of bounces between 2 and 5. When critical values, for example the bounce number or the bounce duration, are exceeded, the load contact can weld together permanently, thus leaving the load switched on, which can constitute a potentially hazardous state.

The change in the bounce behaviour can be the result of a variety of effects, for example a switching cycle number at the load contact, an effect of ambient temperature or mechanical wear, an effect of a control voltage or fatigue of contact springs.

In this design example, the bounce behaviour, such as the bounce number or the bounce duration, of the load contact is determined. In the event of changes in which the bounce behaviour changes to critical values with respect to the bounce number or the bounce duration, the electromechanical component is provided with information regarding said change in state. A warning can subsequently be issued to an operator, for example, or a shutdown can be executed at a suitable point in time prior to a failure, and thus prior to a critical state.

The bounce behaviour can be determined by sensing the load current using a current sensor, for example a Reed contact, and/or sensing the mechanical reaction of the contact bounce on the control current of the relay coil. In the event of bouncing contacts, the load current is briefly switched off by the open contact. At high loads, an arc can occur between the open contacts. Sensing the interruption and/or the change in the load current can be challenging if the load voltage is very high, for example at mains voltage, and the remaining source voltage consequently changes only very little due to the standing arc.

Figure 5A:
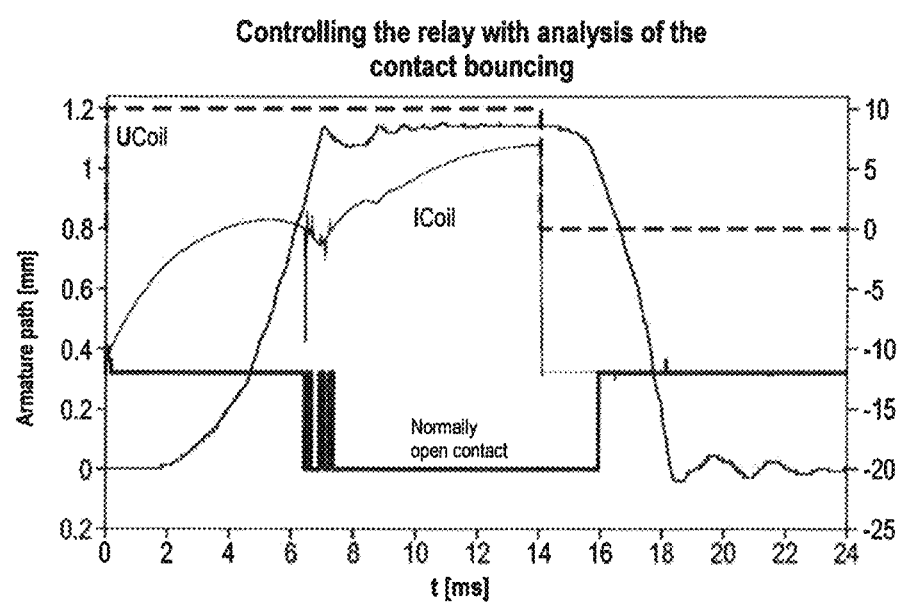
FIG. 5a shows a schematic diagram of time profiles of state variables of an electromechanical component.

For this reason, the mechanical effect of the bouncing contact on the control current of the coil can be determined additionally or in parallel. The excitation voltage of the relay coil, the coil current, the contact current at the normally open contact and the armature movement are shown in FIG. 5a. These state variables can be sensed metrologically. It can clearly be seen that the bounces of the normally open contact have an effect on the coil current. This effect on the coil current can be sensed and evaluated metrologically.

Figure 5B:
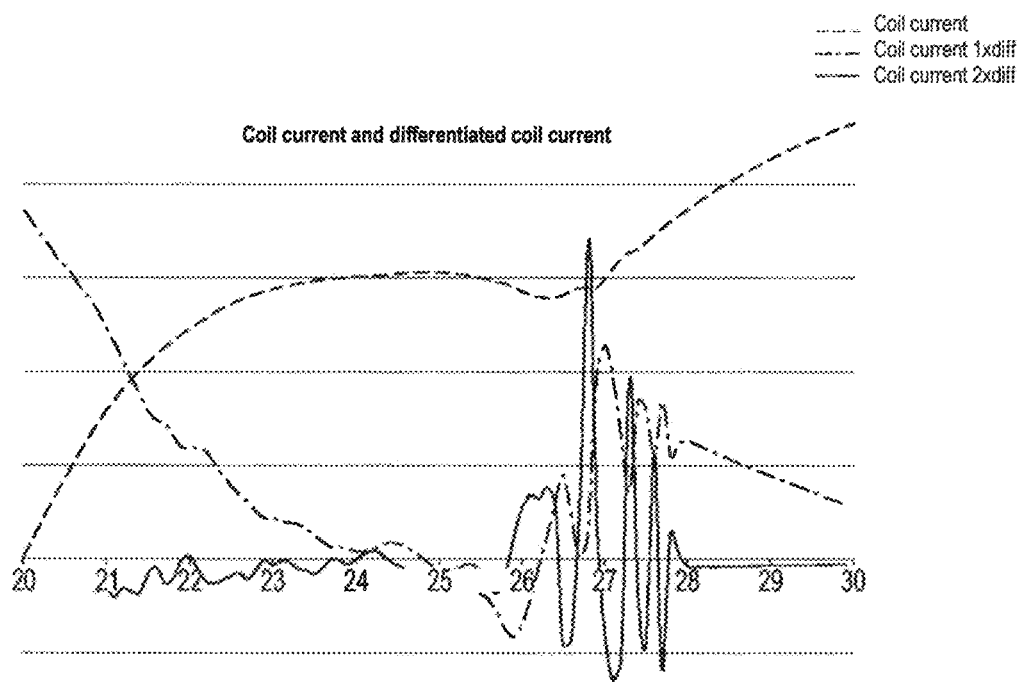
FIG. 5b shows a schematic diagram of time profiles of state variables of an electromechanical component.

One possible method of evaluation is the use of 1 to 2-fold differentiation of the coil current to sense the change in the coil current, as is shown in FIG. 5b for example. After the first contact has been made and after 2-fold differentiation of the coil current, the bounces are identifiable as zero points. The number and duration of the contact bounces can be identified on the control side using the number and duration of the zero points.

Another possible application is the analysis of the causes of contact bounces and, if appropriate, a correction in the course of the ongoing operation. One cause for the occurrence of contact bounces can, for example, be heating of the relay and an associated increase of the coil resistance. This effect reduces the coil current for exciting the relay, which can at the same time result in a reduction of the force of the magnet system and, associated with that, an increase in the bounce duration or the number of bounces.

Other possibilities are changes in the mechanical parameters, for example as a result of friction or fatigue, and with it changes in the kinetic conditions when contact is made. To identify the reasons for this, the determined state variables of the behaviour model under variation of the relay parameters can be compared to the measured state variables of the real object. By optimising the model parameters with the objective of a minimum deviation of a model characteristic, for example the differentiated coil current and the measured differentiated coil current, the parameters governing the changed behaviour of the real object and the size of said parameters can be determined. Based on this knowledge and, for example, by changing the control characteristics, for example a current increase, a voltage value, a pulse shape, a pulse duration, a pulse frequency in the case of a pulse-width modulation (PWM), a control of the bounce behaviour can have the effect that the number or duration of the bounces is minimised and the point in time for reaching a critical state, for example a permanently welded contact, can consequently be postponed.

Second Design Example:

A PWM control is often selected for reducing the control power of relays. The advantage of this is that, after being switched on, the relay coil can be operated with a clocked voltage that is sufficient to maintain the operating state. Since the relay parameters can scatter, the pulse width is typically selected such that said operating state is maintained for all possible relays, even under worst case conditions. However, since only very few relays (in normal-distributed processes 0.1%) require these worst-case conditions, the remaining vast majority are controlled at a higher than the necessary power. This power results in heating and therefore to challenges, such as in the case of a large number of simultaneously controlled relays.

The concept consists of sensing the optimum control power for the respective relay, for example by means of a pulse-pause ratio, and setting the control to a minimum, so that the operating position is always maintained.

The sequence is carried out, for example, as follows:

Step 1: Excitation of the relay with full voltage during the switched-on time until safe attainment of the end position.

Step 2: PWM sampling of the operating voltage and measurement of the coil current.

Step 3: At incipient armature movement—identifiable by an increase in the coil voltage—changing the pulse ratio such that the armature again remains safely in the operating position.

Figure 5F:
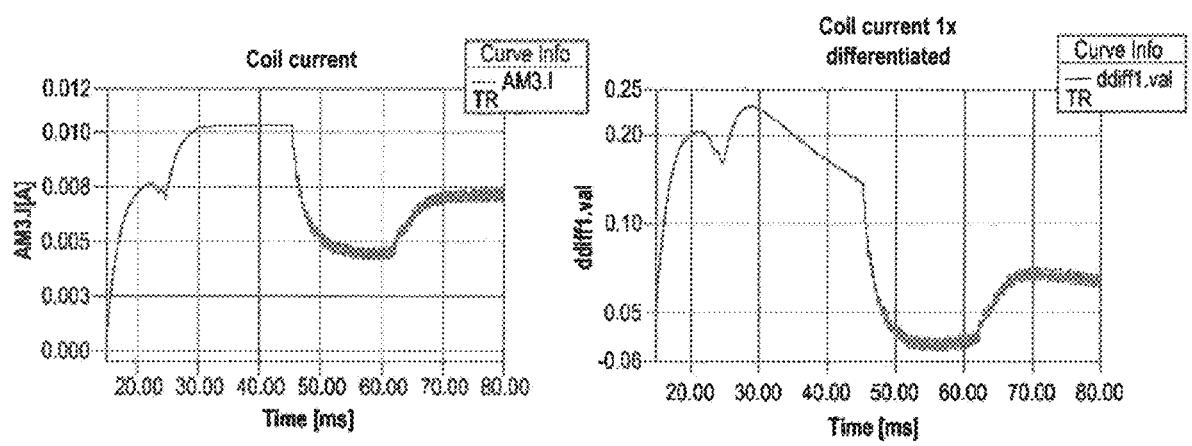
FIG. 5f shows a schematic diagram of time profiles of state variables of an electromechanical component.

Examples of the profile of the control voltage, the coil current, the movement of the armature and the contact force under normal conditions are shown in FIG. 5c. After 45 ms, the coil voltage is switched to a PWM, which is designed such that the armature remains in the operating position. FIG. 5d shows an exemplary case in which the PWM is insufficient, so that, after a time delay of approximately 62 ms, the armature starts to release from the end position, which also reduces the contact force. FIGS. 5e and 5f show a state in which the armature movement is detected by differentiating the coil current and the armature movement is sensed by means of a positive zero crossing of the differentiated armature current. The PWM is then changed using this signal, for example by increasing a duty cycle value, such that the armature immediately safely resumes the end position. The resulting remaining armature movement is minimal and the contact force at the load contact remains practically unchanged, as is shown in FIG. 5e.

Figure 6A:
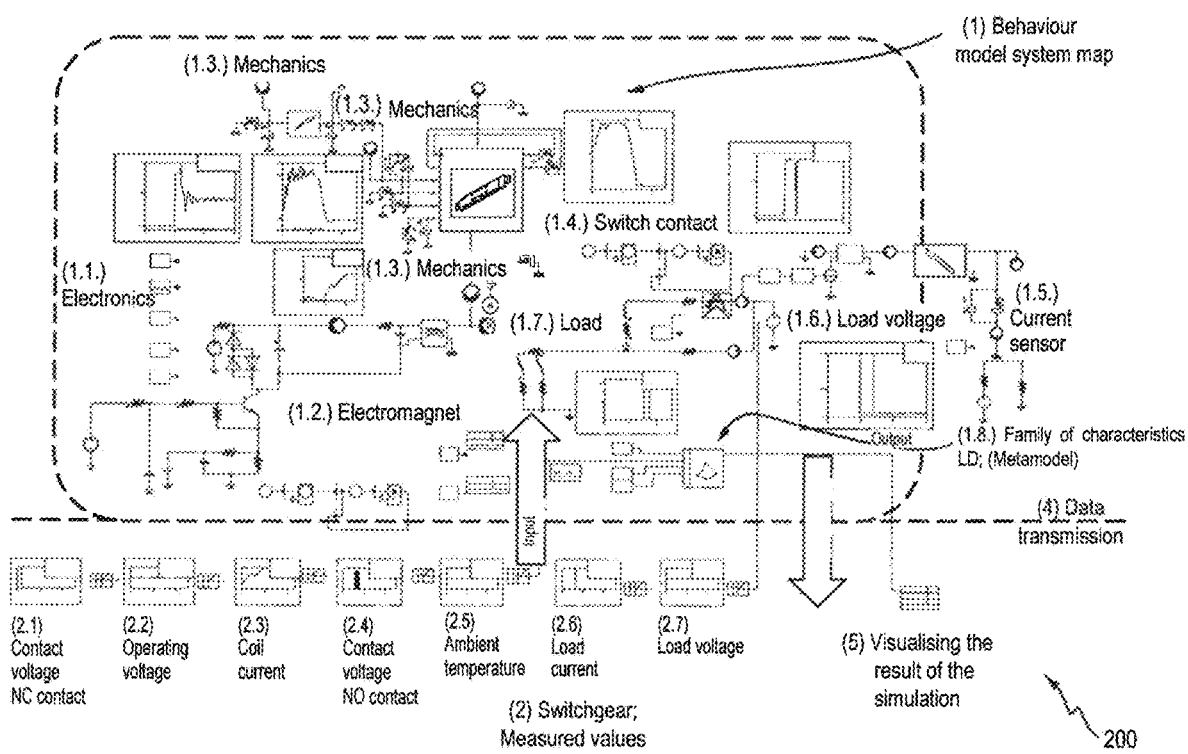
FIG. 6a shows a schematic diagram of an electromechanical component.
Figure 6B:
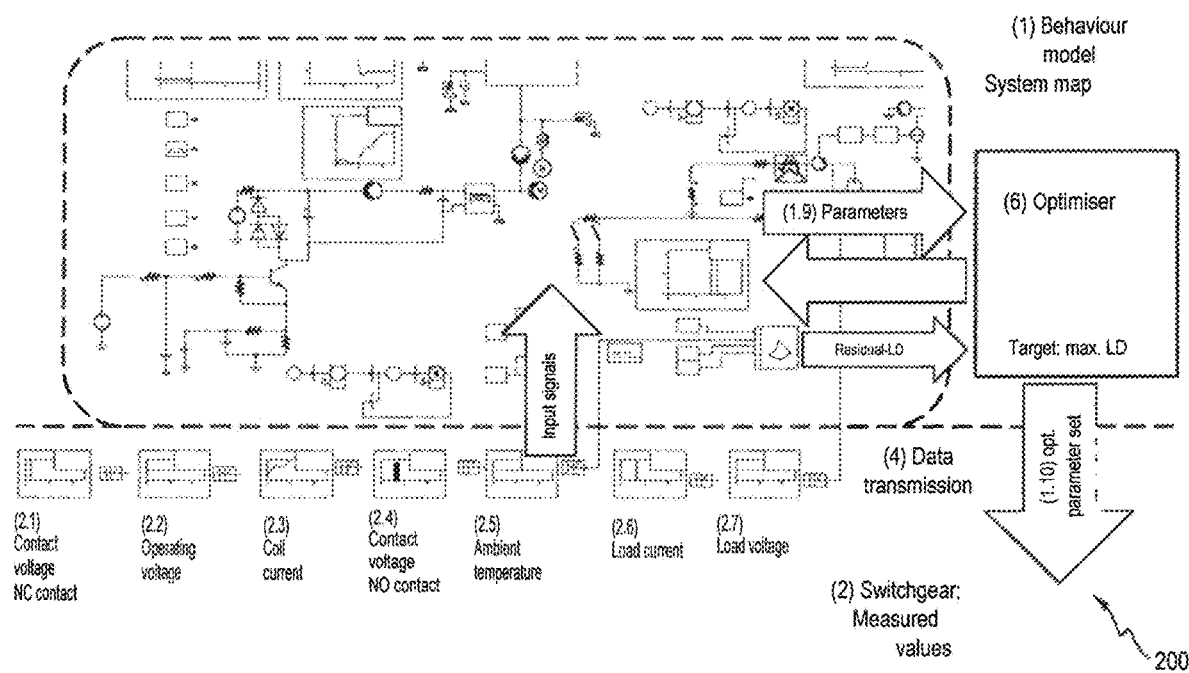
FIG. 6b shows a schematic diagram of an electromechanical component.
Figure 6B:
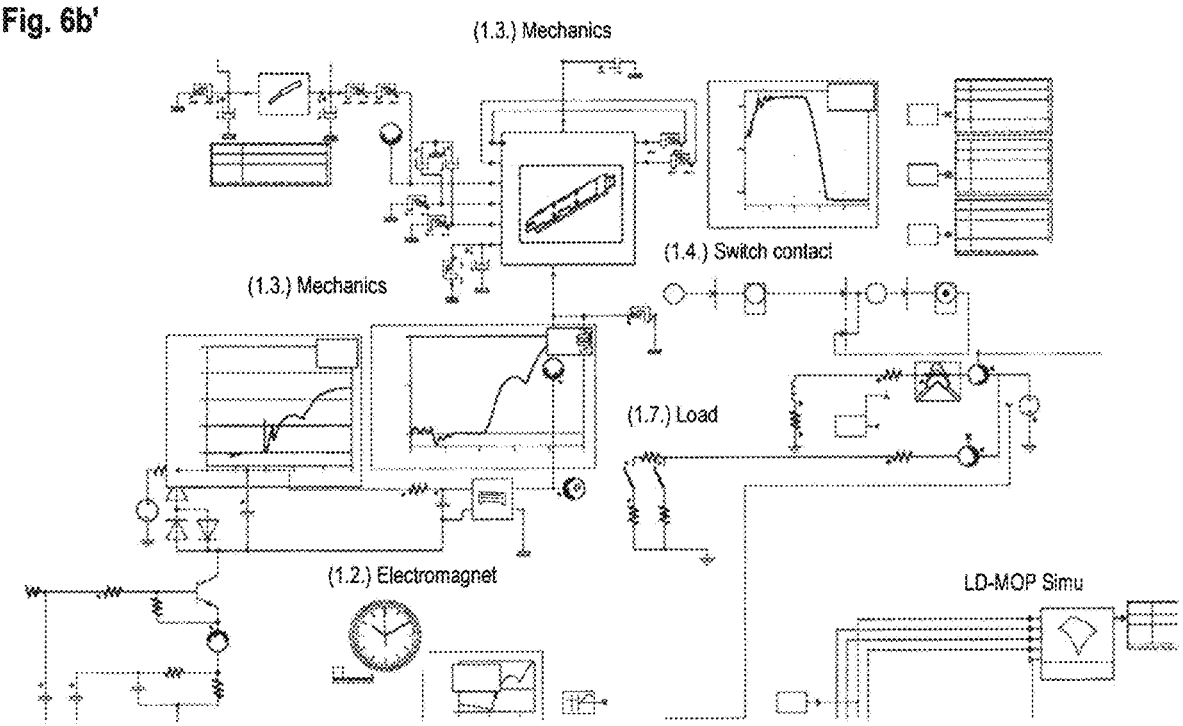

FIG. 6a, FIG. 6a', FIG. 6b and FIG. 6b' show a schematic diagram of an electromechanical component 200. The described concept allows a realisation of a "digital twin" on the basis of a physical behaviour model of the electromechanical component 200. The behaviour model can be implemented with the aid of a system simulator.

As a system map, the behaviour model (1) includes physical models of all components of the electromechanical component 200, such as for example:

(1.1) Electronics (control circuit relay, including the switch request block);

(1.2) Electromagnet (magnet system relay);

(1.3) Mechanics (contact spring, return springs relay);

(1.4) Switch contact (model contact resistance, arc switch contact relay);

(1.5) Current sensor (sensor load current);

(1.6) Load voltage;

(1.7) Load (resistance, inductance, capacitance); and (1.8) Family of characteristics service life.

To do this, results of tests and associated relay parameters can be depicted in a substitute model or a metamodel similar to a family of characteristics. It can be advantageous to generate different models for different types of load, for example direct current or alternating current, and also failure mechanisms, for example a non-opening contact as a potentially hazardous failure or a non-closing contact. The generation of a substitute model is carried out using the of MOP (Metamodel of Optimal Prognosis) method, for example.

The behaviour model (1) is initialised in a new or original state with data from production or from the final inspection in such a way that the state of the respectively associated hardware is depicted. State variables in the form of measurement data are transmitted to, and read into, the behaviour model by means of a communication interface 203 for data transmission, for example using USB, LAN or firewire.

The state variables include, for example:
(2.1) Contact voltage NC contact;
(2.2) Operating voltage control circuit;
(2.3) Coil current relay;
(2.4) Contact voltage NO contact (load contact);
(2.5) Ambient temperature;
(2.6) Load current; and
(2.7) Load voltage.

The behaviour is then simulated using the currently valid state variables from the electromechanical component 200. To do so, inner relay parameters, e.g. an overstroke of the load contact or a friction path of the load contact, which cannot be sensed metrologically but can be relevant for the behaviour (e.g. failure/service life), for example, are obtained from the simulation.

In addition, the measured values transmitted as signals are converted using mathematical operations, such as integral operations, transformations or derivatives, such that the characteristic properties of the signals can be displayed, for example using coefficients. These can be displayed and processed in the same way as normal parameters.

The transmitted measured values and the parameters determined from said measured values in the simulation as well as the parameters determined in the simulation with the behaviour model are, for example, processed in at least one metamodel for predicting a failure behaviour, for example a remaining switching cycle number.

The state variables or states are output or visualised. In the case of a significant reduction in the expected residual service life or a short residual service life, an unexpected failure can be avoided with preventive maintenance, for example. In the case of a remaining long residual service life, a planned maintenance can be postponed, for example.

The behaviour model can be disposed locally in an extension of the hardware of the electromechanical component 200. In this case, data transmission takes place via an internal bus, for example. For a plurality of electromechanical components 200, the behaviour model can be arranged in a machine line in a data processing device located in the local network, for example, or, for one or more electromechanical components, it can be arranged at a remote location, for example in a cloud.

In a further application, the electromechanical component 200 can be actively affected or optimised by changing adjustable parameters (1.9), such as for example:
an operating voltage;
a PWM duty cycle value; or
a switching sequence with redundancy.

To do this, an optimiser (6) can optimise the results of the simulation, for example the residual service life, on the level of the simulation model under variation of simulation parameters (1.9), for example relay characteristic values, such that an optimum parameter set (1.10) is found, with which, for example, the longest possible residual life is achieved.

All the features described and shown in connection with individual examples can be provided in different combinations in the subject according to the present disclosure, in order to achieve all the beneficial effects thereof at the same time.

LIST OF REFERENCE NUMBERS

100 Method for monitoring an electromechanical component
101 Sensing a current mechanical state variable
103 Sensing a current electrical state variable
105 Determining a state of the electromechanical component
200 Electromechanical component
201 Sensing device
203 Communication interface
301 Data processing device
303 Communication network
401 Firmware component
403 Electronics component
405 Electromechanical component
407 Fluid component
409 Data interface
411 Firmware module
413 Electronics module
415 Electromagnetic module
417 Mechanics module
419 Metamodel module
421 Object
423 Object
425 Object

What is claim is:

1. A method for monitoring an electromechanical component of an automation system, comprising:
sensing a current mechanical state variable of the electromechanical component;
sensing a current electrical state variable of the electromechanical component; and
determining a state of the electromechanical component based at least in part on a behaviour model of the electromechanical component, wherein the behaviour model takes into account an effect of the sensed current mechanical state variable on the sensed current electrical state variable, wherein the state of the electromechanical component is determined by running a behaviour simulation of the electromechanical component, wherein the behaviour simulation implements the behaviour model.

2. The method according to claim 1, wherein, sensing the current mechanical state variable comprises sensing an electrical variable of the electromechanical component.

3. The method according to claim 2, wherein the electrical variable comprises one or more of: a load current, a change in a load current, a current through the electromechanical component, or a voltage of the electromechanical component.

4. The method according to claim 1, wherein the electromechanical component is a relay.

5. The method according to claim 1, wherein the current mechanical state variable includes one or more of the following mechanical state variables: a bounce of a contact of the electromechanical component, a bounce duration of a bounce of a contact of the electromechanical component, a number of bounces of a contact of the electromechanical component, a temperature of an element of the electromechanical component, an ambient temperature of the electromechanical component, a movement speed of an element of the electromechanical component, a contact force of a contact of the electromechanical component, or a release force of a contact of the electromechanical component.

6. The method according to claim 1, wherein the behaviour model is associated with the electromechanical component, wherein the behaviour model provides a profile of the electrical state variable as a function of the mechanical state variable.

7. The method according to claim 1, further comprising displaying the determined state of the electromechanical component on a display device.

8. The method according to claim 1, further comprising generating a control signal for controlling the electromechanical component in response to the determined state of the electromechanical component, and controlling the electromechanical component using the generated control signal.

9. The method according to claim 1, wherein the current mechanical state variable and the current electrical state variable are sensed by the electromechanical component.

10. The method according to claim 1, further comprising transmitting the sensed current mechanical state variable and the sensed current electrical state variable from the electromechanical component to a remote data processing device via a communication network, and wherein the state of the electromechanical component is sensed by the remote data processing device and transmitted to the electromechanical component.

11. An electromechanical component comprising:
a sensing device configured to sense a current mechanical state variable of the electromechanical component and a current electrical state variable of the electromechanical component; and
a communication interface configured to transmit the sensed current mechanical state variable and the sensed current electrical state variable to a remote data processing device via a communication network for determining a state of the electromechanical component on the basis of a behaviour model of the electromechanical component, wherein the behaviour model takes into account an effect of the sensed current mechanical state variable on the sensed current electrical state variable, wherein the communication interface is configured to receive information about the determined state via the communication network, wherein the state of the electromechanical component is determined by running a behaviour simulation of the electromechanical component, and wherein the behaviour simulation implements the behaviour model.

12. The electromechanical component according to claim 11, further comprising a display device configured to display the sensed state.

13. The electromechanical component according to claim 11, further comprising a control device configured to generate a control signal for controlling the electromechanical component in response to the sensed state and to control the electromechanical component using the generated control signal.

14. A non-transitory computer-readable medium comprising program code executable by a processor to:
sense a current mechanical state variable of an electromechanical component of an automation system;
sense a current electrical state variable of the electromechanical component; and
determine a state of the electromechanical component based at least in part on a behaviour model of the electromechanical component, wherein the behaviour model takes into account an effect of the sensed current mechanical state variable on the sensed current electrical state variable, wherein the state of the electromechanical component is determined by running a behaviour simulation of the electromechanical component, wherein the behaviour simulation implements the behaviour model.

15. The non-transitory computer-readable medium of claim 14, wherein the wherein the current mechanical state variable includes one or more of the following mechanical state variables: a bounce of a contact of the electromechanical component, a bounce duration of a bounce of a contact of the electromechanical component, a number of bounces of a contact of the electromechanical component, a temperature of an element of the electromechanical component, an ambient temperature of the electromechanical component, a movement speed of an element of the electromechanical component, a contact force of a contact of the electromechanical component, or a release force of a contact of the electromechanical component.

16. The non-transitory computer-readable medium of claim 14, wherein the behaviour model is associated with the electromechanical component, wherein the behaviour model provides a profile of the electrical state variable as a function of the mechanical state variable.

17. The non-transitory computer-readable medium of claim 14, wherein the program code is further executable by a processor to display the determined state of the electromechanical component on a display device.

18. The non-transitory computer-readable medium of claim 14, wherein the program code executable by the processor to sense the current mechanical state variable is further executable by the processor to sense an electrical variable of the electromechanical component.

19. The non-transitory computer-readable medium of claim 18, wherein the electrical variable comprises one or more of: a load current, a change in a load current, a current through the electromechanical component, or a voltage of the electromechanical component.

* * * * *